UNITED STATES PATENT OFFICE.

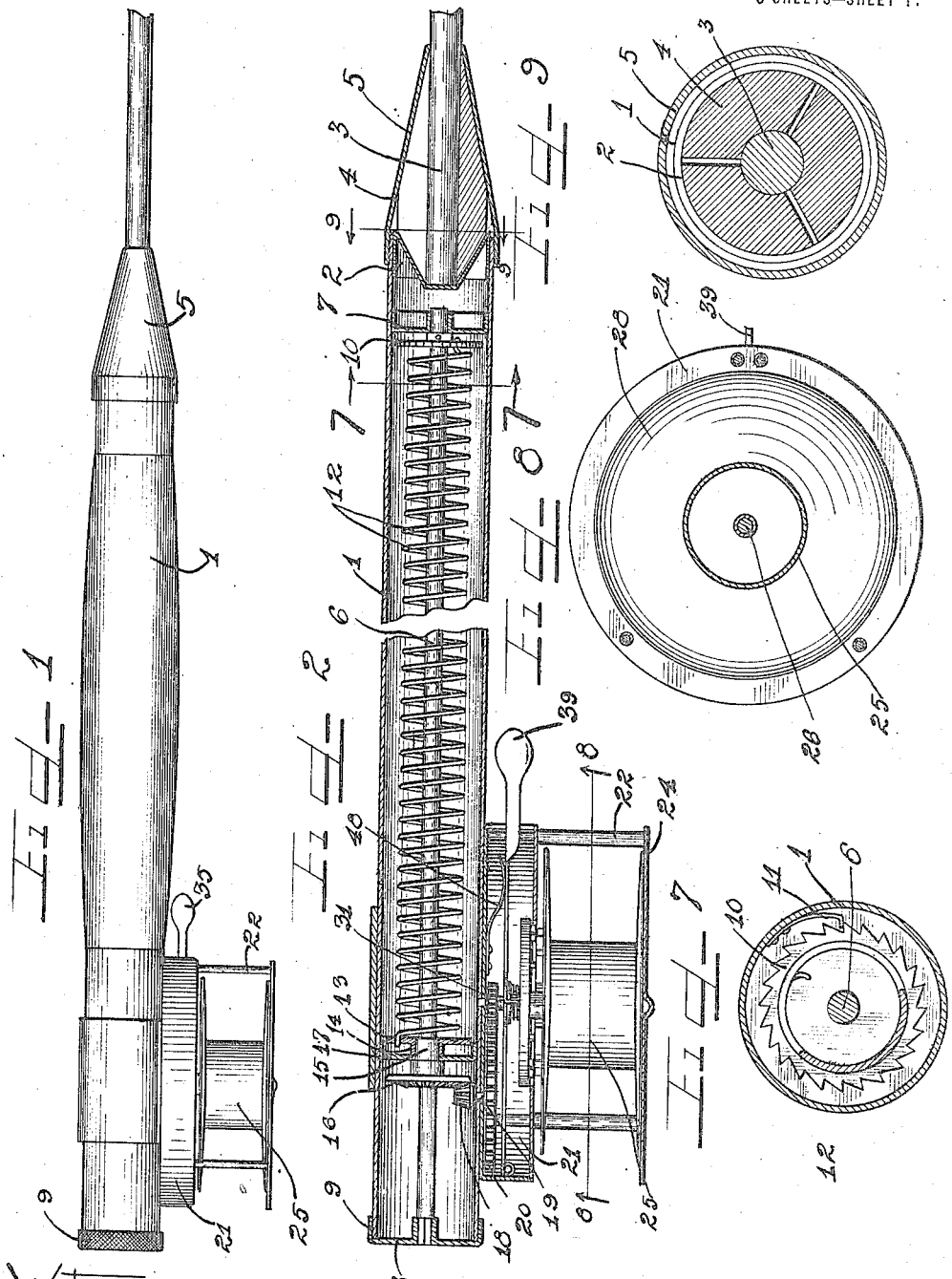

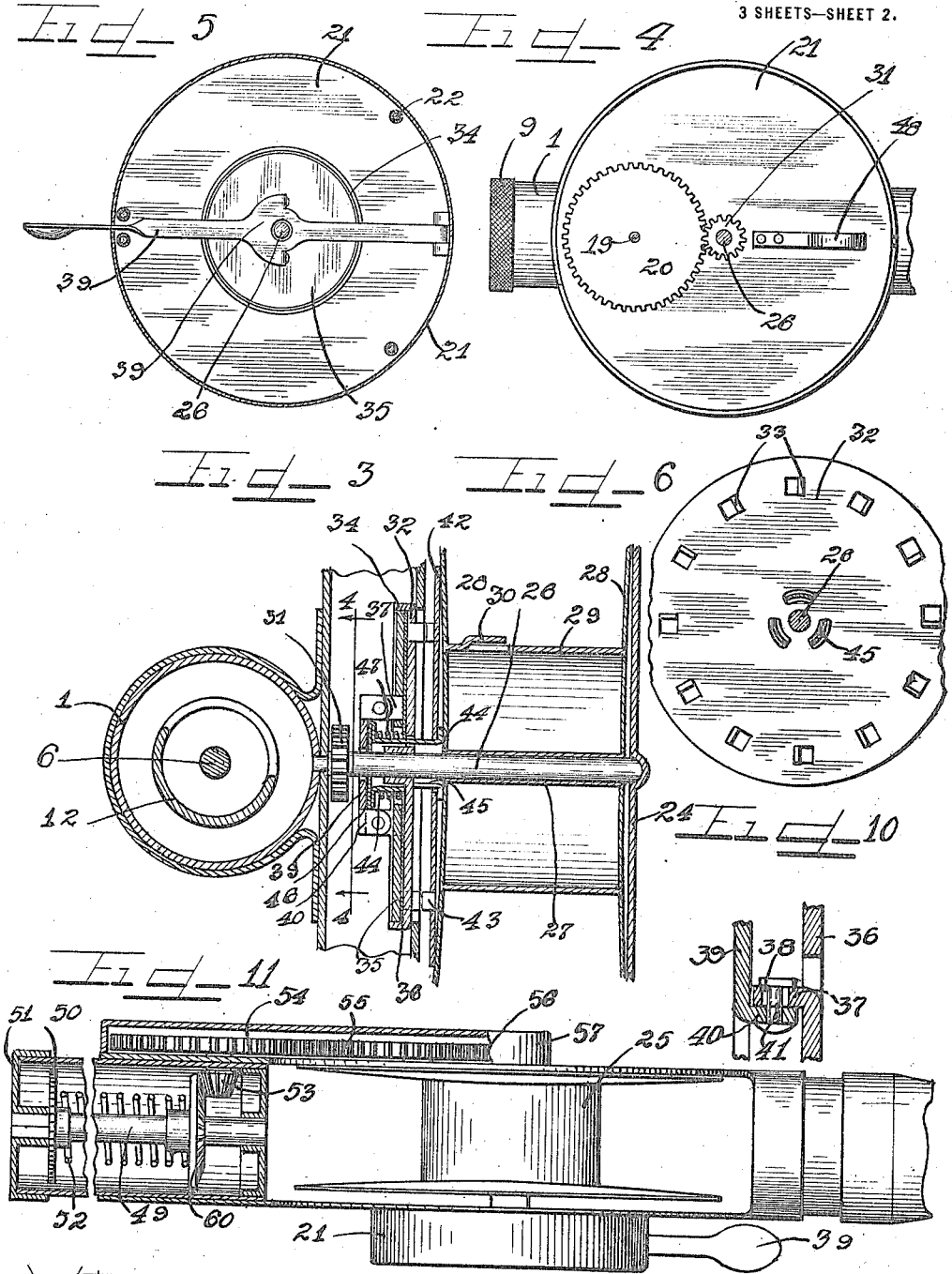

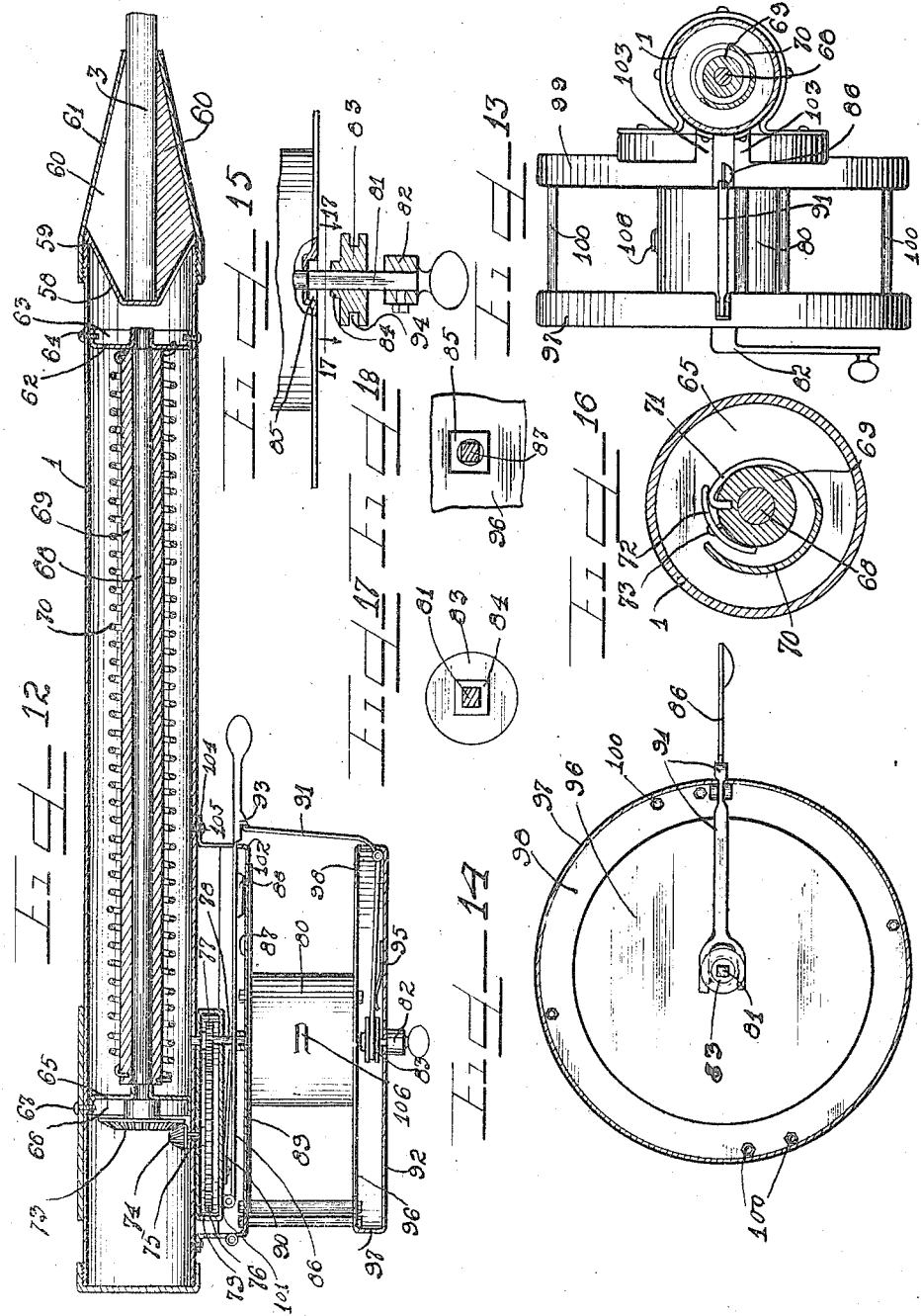

ARTHUR N. SANFORD, OF WHITEFISH, MONTANA.

AUTOMATIC FISHING-REEL.

1,263,939.　　　　　　Specification of Letters Patent.　　Patented Apr. 23, 1918.

Application filed July 9, 1917. Serial No. 179,315.

*To all whom it may concern:*

Be it known that I, ARTHUR N. SANFORD, a citizen of the United States, and a resident of the town of Whitefish, in the county of Flathead and State of Montana, have invented certain new and useful Improvements in an Automatic Fishing-Reel; and I do hereby declare that the following is a full, clear, and exact description of the same, reference being had to the accompanying drawings, and to the numerals of reference marked thereon, which form a part of this specification.

This invention relates to improvements in automatic fishing reels.

It is an object of this invention to provide a fishing reeling mechanism which has a spring motor or part of the tension device mounted in the grip or handle of the rod, and by means of which any desired tension can be secured for quickly winding up the line by the operation of a releasing lever.

It is further an object of this invention to dispose the weight of the reeling mechanism in such a manner that the rod will be better balanced than is possible with the automatic reels heretofore in use.

It is further an object of this invention to provide a reel which, while operating automatically in winding up the line thereon, also is free to be turned by the hand in either direction for unwinding a sufficient length of the line when fishing, and also for initially winding a new line on the reel if desired.

It is further an object of this invention to provide a reel for fishing rods in which the reel is normally held out of engagement with the automatic winding mechanism, said reel being held from accidental rotation by a friction element, but which is free to be manually turned against the friction of the said element.

It is further an object of this invention to provide a powerful acting automatic winding reel, in which a wide range of winding tension may be secured, which is simple to operate and is well balanced.

Other and further objects of this invention will be evident from the disclosure in the drawings and specification.

The invention (in a preferred form) is illustrated in the drawings and hereinafter more fully described.

On the drawings:

Figure 1 is a side view of a reel and handle embodying this invention.

Fig. 2 is a horizontal central section thereof with parts in elevation.

Fig. 3, is a vertical section taken transversely through the handle and reel.

Fig. 4 is a view taken on line 4—4 of Fig. 3, with other parts shown.

Fig. 5 is a view taken on the same line but looking oppositely.

Fig. 6 is a fragmentary detail of one of the clutch wheels.

Fig. 7 is a section taken on line 7—7 of Fig. 2.

Fig. 8 is a section taken on line 8—8 of Fig. 2.

Fig. 9 is a section on line 9—9 of Fig. 2.

Fig. 10 is a fragmentary detail of the method of attaching the release lever and brake.

Fig. 11 is a top plan view with parts in section of a modified form of reel.

Fig. 12 illustrates a modified form of reel and handle embodying my invention.

Fig. 13 is a transverse section taken through the handle with the reel in elevation.

Fig. 14 is a section taken through the reel adjacent the brake and levers.

Fig. 15 is an enlarged fragmentary detail of the brake mechanism and winding crank.

Fig. 16 is an enlarged section taken through the handle showing the method of releasably attaching the end of the torsion spring.

Fig. 17 is a section on line 17—17 of Fig. 15.

Fig. 18 is a section taken on the same line, but looking oppositely.

As shown on the drawings:

1, indicates a hollow cylindrical handle which may be supplied with any suitable grip as of cork, in the inner end of which is secured by brazing or otherwise a cone-shaped member or stop 2, adapted to receive the end of the rod 3, thereagainst, around which are provided a plurality of cone-shaped clamping segments 4, over which the cone-shaped sleeve 5, fits and firmly clamps the segments against the rod by threading on the end of the handle, as shown. The spring motor or tension device in said handle comprises a longitudinal shaft 6, which is journaled at its inner end in a bearing 7, in said cylindrical sleeve or casing 1, and at its outer end has a milled member or head 8, rigidly secured thereto for rotating the same. Said milled head has an inturned flange 9, which fits around the end of the cylinder and is rotatable thereon.

A ratchet wheel 10, is rigidly secured on said shaft near its inner end, and a spring pawl 11, is attached to the cylinder wall at one end and at its outer end engages the teeth of the ratchet wheel, permitting rotation in one direction but preventing reverse rotation thereof. A coiled tension spring 12, is rigidly secured at its inner end to the ratchet wheel 10, and at its outer end is rigidly secured to a wheel 13, having a collar 14, which is rigidly secured on the short shaft 15, rotatable on the shaft 6. A bearing 17, is provided for both of said shafts 6 and 15, and the shaft 15, has a bevel gear 16, secured thereon which in turn meshes with a bevel pinion 18, secured to the shaft 19, journaled in the wall of the cylinder, and a gear 20, is secured on the outer end of said shaft 19.

Secured to the handle 1, in any suitable manner is a casing 21, to which are secured bolts or pins 22, as shown, three in number, to the outer end of which a disk 24, is secured, between which and the casing 21, the reel is positioned to rotate. The reel indicated as a whole by 25, is rotatably mounted on a shaft 26, which is journaled at one end in the handle 1, and at its opposite end in the disk 24. Said reel comprises a hub 27, provided with integral flanges 28, to which is secured a drum 29, on which a finger or lip 30, is struck up for engaging one end of the line thereto.

A pinion 31, is secured on said shaft 26, at its inner end, and meshes with gear 20. Also rigidly secured to the shaft 26, is a combined brake and clutch member 32, which, as shown in Figs. 3 and 6, has clutch teeth 33, struck outwardly therefrom, and forms one member of a clutch, and said member is also provided with a rearwardly directed flange 34, within which a brake member 35, engages, and any suitable friction or brake lining 36, is secured to the brake. Said brake is provided with integral lugs 37, which are provided with elongated apertures 38. A release lever 39, is pivoted at its inner end to the casing 21, and is slidably engaged on the shaft 26, near its center. Said lever projects through a suitable slot in the wall of the casing and has its end shaped for ready engagement by one of the fingers. Integral with said levers are lugs 40, which are connected to the slotted lugs 37, by means of rivets 41, shown in detail in Fig. 10.

Brazed or otherwise rigidly secured to one flange 28, of the reel, is a clutch member 42, which has clutch teeth 43, struck therefrom, as shown in Fig. 6. A hub member 44 is provided, which is slotted to provide arms 45, which extend through concentric slots in the clutch member 32, shown in Fig. 6, and extend through a central aperture in the clutch member 42, and have their ends directed outwardly between the flange 28, of the reel, and said clutch member 42. Said ends frictionally engage between the reel flange and clutch member, preventing rotation of the reel except when manually operated. Secured on said hub member 44, between the clutch member 32, and an enlarged head or flange 46, of the hub, is a spiral spring 47, which extends through an enlarged aperture in the brake, and bears against the clutch member 32, as shown in Fig. 3. Said lever 39, is normally held in the position shown in Figs. 2 and 3, by means of a leaf spring 48.

In the construction shown in Fig. 11, the reel 25, is mounted in the handle, which is cut away for part of its length, as shown, and the casing 21, lever 39, and other parts are mounted on the right hand side of the handle and are all as before described. In this construction, the shaft 49, is provided with a ratchet wheel 50, at its outer end, which has a pawl 11, as hereinbefore described, to prevent rotation thereof except in one direction. Said shaft is also provided with a milled head or closure 51, for rotating the same. A spiral torsion spring 52, is secured at one end to ratchet wheel 50, and at its opposite end is secured a bevel gear 60, which in turn meshes with bevel pinion 53, connected with gear 54, which in turn meshes with an idler gear 55, which meshes with a pinion 56, on the shaft 26, as hereinbefore described. Said gears are provided with a suitable gear casing 57, to inclose the same.

In the construction disclosed in Figs. 12 to 18, inclusive, 1, indicates the handle and 58, a cone-shaped stop member which is flattened centrally for the rod 3, to seat thereon and is provided with a flange 59, which engages against the end of the handle and is retained in place by the chuck member, which comprises segmental sections 60, clamped in place by the sleeve member 61, threaded onto the end of the handle 1.

In this construction, the motor as a whole is removable for the purpose of cleaning or substituting a new part, and, as shown, comprises a bearing 62, having a flange 63, provided with threaded apertures adapted to receive the attaching screws 64. A bearing 65, is provided, which has a flange 66, provided with threaded apertures adapted to receive the attaching screws 67. Journaled in said bearings 62—65, is a shaft 68, on which is secured a lining sleeve 69, of cork, rubber, or any suitable material, and a torsion spring 70, is disposed around the sleeve, having one end engaged to the bearing member 62, and the opposite end 71, directed at an angle therewith to engage in an aperture in the sleeve and detachably held in place by means of a clamp 72, which in turn is securely fastened to the sleeve by means of a screw 73.

The end of the handle opposite the clutch is closed by means of a cap 75, which is threaded onto the handle and the construction so formed is fluid tight so that oil may be inserted in the handle to have the parts run in an oil bath if desired. On the outer end of the shaft 68, is secured a bevel gear 73, which meshes with a bevel pinion 74, on a stud shaft 75, on the opposite end of which is secured a spur gear 76, which meshes with a spur pinion 77, on the reel shaft 78. Said gear 76 and pinion 78, are inclosed by a housing 79. The reel 80, is normally freely rotatable on the shaft 78, and the outer end 81, of the shaft, is squared to receive the winding crank or lever 82, which is rigidly secured thereto.

Slidably engaged on the square end of the shaft is a clutch member 83, having an inner square face 84, adapted to engage in a complemental notch 85, formed in the reel. For the purpose of adjusting the clutch into and out of engagement with the reel, and also braking the reel, a lever 86, is pivoted to the housing 79, which is provided with an enlarged aperture to loosely fit on the reel shaft, and said lever projects outwardly into position to be engaged by the finger. Said lever 86, is provided with a friction brake 88, adapted to bear against a disk 87, rigidly secured on the reel shaft 78, and a pushing spring 90, normally forces the lever so that the friction brake is in engagement with the disk. Said friction brake is provided with a thick felt pad so as to have a friction action until the clutch 83, engages the reel. A lever 91, is pivoted to the disk 92, which incloses the clutch. One arm of said lever extends into position to engage the lug 93, on the lever 86, and the other arm is directed at substantially right angles therewith and forked at its lower end, as shown in Fig. 14, and engages in an annular groove 94, in the clutch. A spring 95, acts to automatically throw the clutch into engagement with the reel when the lever 86, is manually operated to release the brake 88.

As shown in Fig. 12, the reel disks 89—96, are secured to the reel, and the disk 96, is partly inclosed by a housing comprising a disk 92, before mentioned, which has an inturned annular periphery 97, cut away as shown in Fig. 13, to permit the lever 91, extending into the housing. Integral with the periphery is an inturned flange 98, which fits closely to the disk 96, and acts to guide the string on the reel. An annular member 99, is bolted to the flange 98, by means of bolts 100. Said member 99, is hinged in turn to a bracket 101, secured to the handle, and has an inturned flange 102, adapted to fit closely to the disk 89, of the reel to guide the string thereon. Said annular member 99, is provided with an arm 103, which has a flange 104, to receive screws 105, therein, to tightly secure the same to the handle, and said arm is provided with a slot to permit free movement of the lever 86. By this arrangement, by removal of the screws 105, the annular member and outer housing can be swung outwardly to expose the reel when desired. As shown, a finger 106, is struck outwardly to engage the line in winding the same onto the reel.

The operation is as follows:

When it is desired to attach a line, this is easily accomplished either automatically or manually by engaging a loop over the finger 30, and manually rotating the reel until the line is wound thereon. This in no way actuates or interferes with any of the mechanism. On the other hand, if it is desired to automatically wind the line on the reel, this may be accomplished as follows: The milled head 8, is rotated to wind up the motor or tension spring 12, and said tension spring is held in its wound or tension position until actuation of the lever 39, against the spring 48.

When the lever is actuated against said spring 48, this releases the hub 44, and the spring 47, draws the hub and consequently the reel 25, until the clutch member 42, engages the clutch member 32. Continued movement of the lever, owing to the slotted connection shown in Fig. 10, releases the brake 35, from the member 32, permitting the torsion spring to rotate said reel by means of bevel gear 16, bevel pinion 18, spur gear 20, spur pinion 31, clutch members 32 and 34. On release of the lever 39, the spring 48, forces the lever to normal position which primarily forces the hub member to throw the clutch member 42, and reel out of engagement with clutch member 32, and secondarily forces the brake 34, into frictional engagement with the brake and clutch member 32, thereby stopping winding of the reel. Of course, at any time the reel may be wound by actuation of the lever, and automatically stopped by release of the same. Also, any desired tension of the spring may be secured for a powerful rapid winding of the line, or a slower and more gentle winding. The reel can at any time be rotated manually to feed out more line, and by actuation of the lever the same may be reeled in at any time. It will be seen that part of the mechanism is mounted in the handle and all of the weight does not come at one side of the handle. The rod is more perfectly balanced, and is not so tiresome to hold as where all the mechanism is in the reel at one side of the handle.

The construction in Fig. 11, distributes more of the weight in the handle, and otherwise operates substantially as hereinbefore described.

In the construction set forth in Figs. 12 to 18, the motor may be wound up by the lever 82, and is held under tension by the brake 88, and brake disk 87. When said lever 86, is thrust inwardly, the spring 95, forces the clutch 83, into engagement with the reel, and the spring motor then acts to rotate the reel. Release of the lever permits spring 90, forcing the same and friction brake into engagement with the friction disk 87, to thereby stop the motor, after which the clutch may be disengaged from the reel by swinging lever 91, to engage the stop or catch 93.

While I have shown but a few different constructions embodying this invention, it is obvious that many different arrangements may be made and details varied without departing from the principles of this invention, and I therefore do not purpose limiting the patent granted otherwise than necessitated by the prior art.

I claim as my invention:

1. A fishing reel comprising a hollow handle, a spring motor therein, a casing secured to the handle, a shaft journaled in the casing, a reel loosely mounted thereon, a clutch member rigidly secured on the reel, a clutch member rigidly secured on the shaft, a hub member secured to the reel and extending through the clutch member on the shaft having a flanged end, a spring bearing against said clutch member on the shaft and said flange, a brake member adapted to engage said clutch member on the shaft and a lever for operating the brake and bearing against the flanged hub member.

2. In a device of the class described a handle having a spring motor therein, a shaft journaled to the handle, gears connecting the same and motor, a reel loosely mounted on the shaft, a clutch disk secured to the reel, a combined clutch and brake member secured to the shaft, a brake member adapted to contact the combined clutch and brake member and to release the same and means for shifting the reel and clutch disk into engagement with the combined clutch and brake member on the shaft.

3. In a device of the class described a hollow handle, a spring motor therein, a shaft journaled to the casing, gearing connecting the shaft and spring motor, a reel loosely mounted on the shaft, a clutch disk secured to the reel, a clutch disk secured to the shaft, a sleeve member on the shaft having a flange at one end and axial arms at the opposite end extending through the clutch on the shaft and engaging between the first named clutch disk and reel, a spring on the sleeve between the clutch disk on the shaft and the flange and a brake member adapted to frictionally contact one of said clutch members to prevent rotation of the reel and to release the same to permit rotation of the reel.

4. In a device of the class described a hollow handle, a spring motor therein, a shaft journaled to the casing, gearing connecting the shaft and spring motor, a reel loosely mounted on the shaft, a clutch disk secured to the reel, a clutch disk secured to the shaft, a sleeve member on the shaft having a flange at one end and axial arms at the opposite end extending through the clutch on the shaft and engaging between the first named clutch disk and reel, a spring on the sleeve between the clutch disk on the shaft and the flange, a brake member adapted to frictionally contact one of said clutch members to prevent rotation of the reel and to release the same to permit rotation of the reel and a lever for actuating the brake member and for sliding the sleeve in one direction and permitting the spring to slide the sleeve oppositely to bring the clutch disks together.

5. In a device of the class described a hollow handle, a torsion spring therein, a shaft connected to be operated from the torsion spring, a reel loosely mounted on said shaft, a clutch member on said reel, a combined clutch and brake element rigidly secured to said shaft, a brake element, a lever normally holding the clutch member out of engagement with the combined clutch and brake element and holding the brake against the same, a connection between the lever and brake permitting the release of the clutch member prior to release of the brake and a spring for actuating the reel and clutch member to engage the combined clutch and brake element.

6. In a device of the class described, a hollow handle, a spring motor mounted therein, a casing secured to the handle, a brake and clutch element in said casing, a reel, a clutch element thereon, a lever for normally holding the brake set and the clutch members out of engagement and adapted when actuated to release the clutch members to engage each other and to release the brake, a spring for forcing the clutch members into engagement, means operated by the motor for winding the reel when the brake is released, and means for automatically setting the brake and disengaging the clutch members.

7. In a device of the class described, a hollow handle, a spring motor therein, a shaft journaled to the handle connected to be rotated by said motor, a reel on said shaft, a clutch member secured to the reel, a clutch member rigidly secured on said shaft, a brake, and mechanism for simultaneously adjusting the reel and clutch members into engagement and releasing the brake permitting the motor to wind the reel.

8. In a device of the class described, a hollow handle, a spring motor therein, a shaft journaled to the handle connected to be rotated by said motor, a reel on said shaft, a clutch member secured to the reel, a clutch member rigidly secured on said shaft, a brake, mechanism for simultaneously adjusting the reel and clutch members into engagement and releasing the brake permitting the motor to wind the reel, and means for automatically disengaging the clutch and setting the brake.

9. In a device of the class described, a handle, a spring motor therein, a shaft connected to be rotated by said motor, a reel on said shaft, co-acting clutch members, one secured to the shaft and the other to the reel, a brake member co-acting with the clutch member on the shaft, and mechanism for shifting the reel for the clutch members to engage and then release the brake member from the clutch member on the shaft to permit the motor rotating the reel.

10. In a device of the class described, a handle, a spring motor therein, a shaft connected to be rotated by said motor, a reel on said shaft, co-acting clutch members, one secured to the shaft and the other to the reel, a brake member co-acting with the clutch member on the shaft, mechanism for shifting the reel for the clutch members to engage and then release the brake member from the clutch member on the shaft to permit the motor rotating the reel, and a spring for automatically operating said mechanism to disengage said clutch members and set the brake.

11. In a device of the class described, a hollow handle, a spring motor therein adapted to be removed as a whole therefrom, a shaft, a reel loosely journaled thereon, a clutch slidable on the shaft adapted to engage the reel, a friction member rigidly secured to the shaft, a lever having a friction member thereon adapted to engage the friction disk, and springs for automatically shifting the clutch into engagement with the reel when the lever is actuated and to automatically return the friction member to engage the friction disk when the lever is released.

In testimony whereof I have hereunto subscribed my name in the presence of two subscribing witnesses.

ARTHUR N. SANFORD.

Witnesses:
S. A. KARSTETTER,
C. H. KARSTETTER.

Copies of this patent may be obtained for five cents each, by addressing the "Commissioner of Patents, Washington, D. C."